(12) United States Patent
Andgart et al.

(10) Patent No.: US 11,039,467 B2
(45) Date of Patent: Jun. 15, 2021

(54) GRANTING RESOURCES TO A WIRELESS DEVICE

(71) Applicant: Telefonaktiebolaget LM Ericsson (publ), Stockholm (SE)

(72) Inventors: Niklas Andgart, Södra Sandby (SE); Henrik Sahlin, Mölnlycke (SE); Gustav Wikström, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 16/086,407

(22) PCT Filed: Feb. 23, 2017

(86) PCT No.: PCT/EP2017/054125
§ 371 (c)(1),
(2) Date: Sep. 19, 2018

(87) PCT Pub. No.: WO2017/167506
PCT Pub. Date: Oct. 5, 2017

(65) Prior Publication Data
US 2019/0281623 A1    Sep. 12, 2019

Related U.S. Application Data

(60) Provisional application No. 62/316,794, filed on Apr. 1, 2016.

(51) Int. Cl.
*H04L 5/00*     (2006.01)
*H04W 72/14*    (2009.01)
(Continued)

(52) U.S. Cl.
CPC ........... *H04W 72/14* (2013.01); *H04L 5/0082* (2013.01); *H04W 72/0446* (2013.01);
(Continued)

(58) Field of Classification Search
CPC .. H04L 5/0082; H04L 5/007; H04W 72/1268; H04W 72/14; H04W 72/0446; H04W 72/0453; H04W 72/1289
(Continued)

(56) References Cited

U.S. PATENT DOCUMENTS 9,832,766 B2    11/2017  Nishikawa et al.
2010/0135237 A1*  6/2010  Papasakellariou .... H04L 5/0053
                                                        370/329
(Continued)

FOREIGN PATENT DOCUMENTS

RU    2503154 C2    12/2013
RU    2554121 C2     6/2015
(Continued)

OTHER PUBLICATIONS

Samsung, "Specification impact for DL due to TTI shortening", 3GPP TSG RAN WG1 Meeting #84, St. Julian's, Malta, Feb. 15, 2016, pp. 1-4, R1-160585, 3GPP.
(Continued)

*Primary Examiner* — Gbemileke J Onamuti
(74) *Attorney, Agent, or Firm* — Coats & Bennett, PLLC

(57) ABSTRACT

There is provided mechanisms for granting resources to a wireless device. A method is performed by a network node. The method comprises obtaining an indication for granting the resources to the wireless device. The method comprises transmitting, to the wireless device, a grant for the resources in a transmission time interval (sTTI) frequency band. The grant comprises an index, and the index identifies a position of the resources within the sTTI frequency band.

32 Claims, 5 Drawing Sheets

(51) Int. Cl.
*H04W 72/04* (2009.01)
*H04W 72/12* (2009.01)

(52) U.S. Cl.
CPC ... *H04W 72/0453* (2013.01); *H04W 72/1268* (2013.01); *H04L 5/0007* (2013.01); *H04W 72/1289* (2013.01)

(58) Field of Classification Search
USPC .......................................................... 370/329
See application file for complete search history.

(56) References Cited

U.S. PATENT DOCUMENTS

| | | |
|---|---|---|
| 2010/0304774 A1 | 12/2010 | Lee et al. |
| 2011/0105136 A1 | 5/2011 | Choi |
| 2011/0223924 A1 | 9/2011 | Löhr et al. |
| 2012/0113936 A1 | 5/2012 | Moulsley et al. |
| 2013/0114572 A1* | 5/2013 | Fong ................. H04W 56/0045 370/336 |
| 2013/0343313 A1 | 12/2013 | Takeda et al. |
| 2014/0153539 A1 | 6/2014 | Seo et al. |
| 2014/0226607 A1 | 8/2014 | Holma et al. |
| 2014/0334397 A1 | 11/2014 | Chen et al. |
| 2018/0110062 A1* | 4/2018 | Byun ........................ H04B 7/26 |
| 2019/0081722 A1* | 3/2019 | Takeda .............. H04W 72/0446 |

FOREIGN PATENT DOCUMENTS

| | | |
|---|---|---|
| RU | 2563249 C2 | 9/2015 |
| WO | 2010105255 A2 | 9/2010 |
| WO | 2017076459 A1 | 5/2017 |

OTHER PUBLICATIONS

Huawei, "Control signaling enhancements for short TTI", 3GPP TSG RAN WG1 Meeting #83, Anaheim, USA, Nov. 15, 2015, pp. 1-6, R1-156461, 3GPP.

Ericsson, "DCI for short TTI uplink transmissions", 3GPP TSG RAN WG1 Meeting #84, St. Julian's, Malta, Feb. 15, 2016, pp. 1-7, R1-160938, 3GPP.

ETRI, "Overview on frame structure and downlink design for TTI shortening", 3GPP TSG RAN WG1 Meeting #84, St. Julian's, Malta, Feb. 15, 2016, pp. 1-7, R1-161011, 3GPP.

3rd Generation Partnership Project, "3rd Generation Partnership Project; Technical Specification Group Radio Access Network; Evolved Universal Terrestrial Radio Access (E-UTRA); Multiplexing and channel coding (Release 12)", Technical Specification, 3GPP TS 36.212 V12.6.0, Sep. 1, 2015, pp. 1-95, 3GPP, France.

* cited by examiner

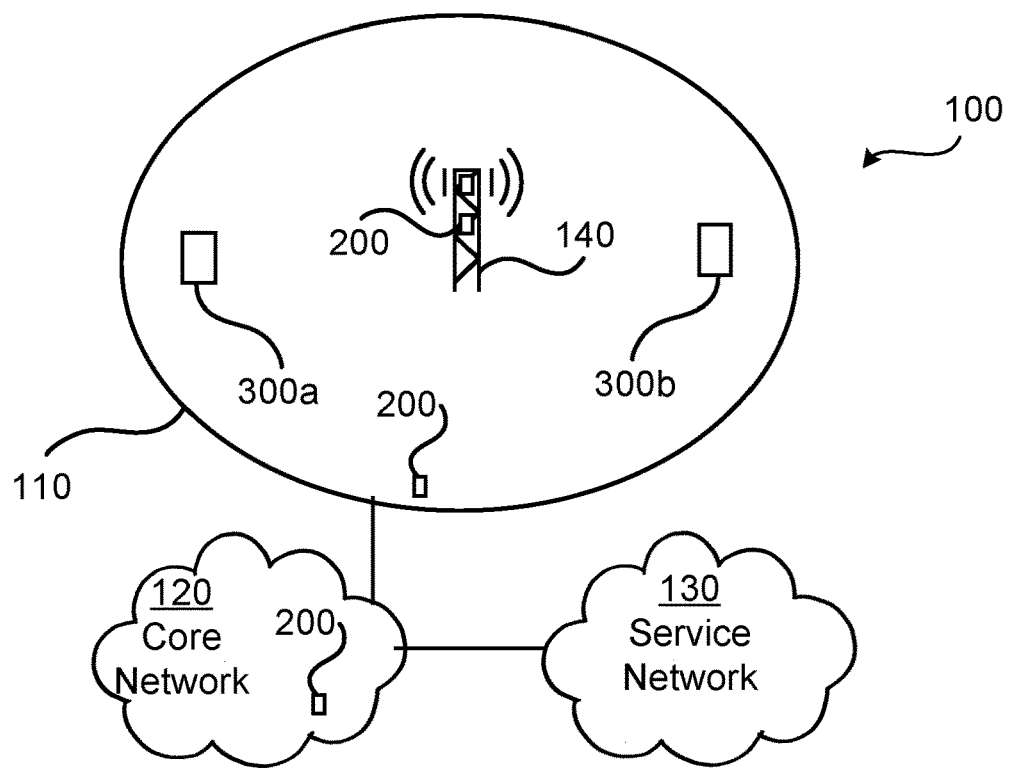
Fig. 1
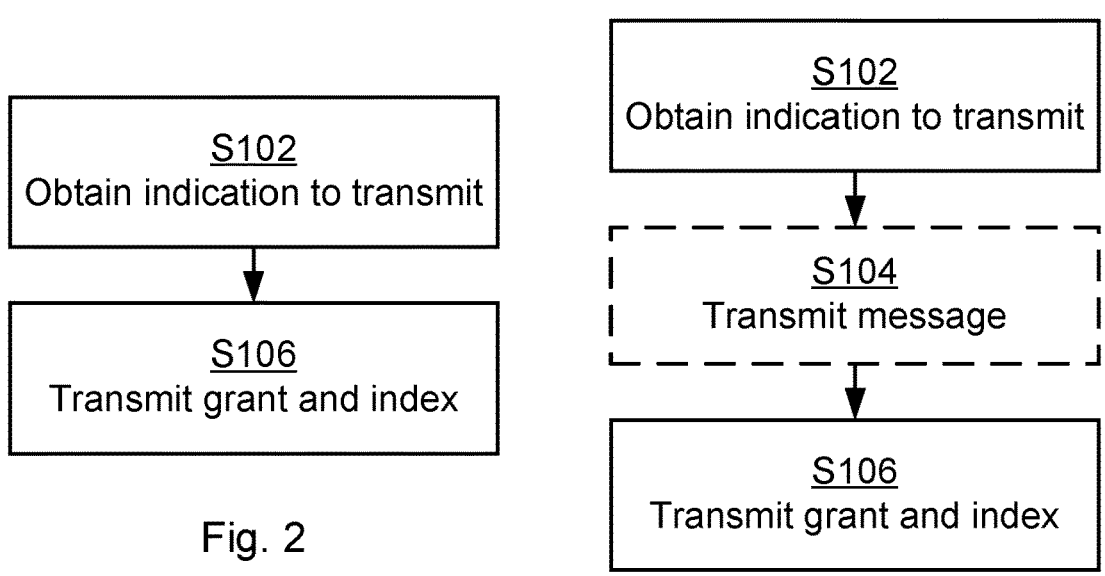
Fig. 2
Fig. 3

GRANTING RESOURCES TO A WIRELESS DEVICE

TECHNICAL FIELD

Embodiments presented herein relate to a method, a network node, a, computer program, and a computer program product for granting resources to a wireless device. Embodiments presented herein further relate to a method, a wireless device, a, computer program, and a computer program product for receiving granting of resources from a network node.

BACKGROUND

In communications networks, there may be a challenge to obtain good performance and capacity for a given communications protocol, its parameters and the physical environment in which the communications network is deployed.

For example, one parameter in providing good performance and capacity for a given communications protocol in a communications network is packet data latency. Latency measurements can be performed in all stages of the communications network, for example when verifying a new software release or system component, and/or when deploying the communications network and when the communications network is in commercial operation.

Shorter latency than previous generations of 3 GPP radio access technologies was one performance metric that guided the design of Long Term Evolution (LTE). LTE is also now recognized by the end-users to be a system that provides faster access to internet and lower packet latencies than previous generations of mobile radio technologies.

Packet latency is also a parameter that indirectly influences the throughput of the communications network. Traffic using the Hypertext Transfer Protocol (HTTP) and/or the Transmission Control Protocol (TCP) is currently one of the dominating application and transport layer protocol suite used on the Internet. The typical size of HTTP based transactions over the Internet is in the range of a few 10's of Kilo byte up to 1 Mega byte. In this size range, the TCP slow start period is a significant part of the total transport period of the packet stream. During TCP slow start the performance is packet latency limited. Hence, improved packet latency can potentially improve the average throughput, at least for this type of TCP based data transactions.

Radio resource efficiency could also be positively impacted by packet latency reductions. Lower packet data latency could increase the number of transmissions possible within a certain delay bound; hence higher Block Error Rate (BLER) targets could be used for the data transmissions freeing up radio resources potentially improving the capacity of the system.

The existing physical layer downlink control channels, Physical Downlink Control Channel (PDCCH) and enhanced PDCCH (ePDCCH), are used to carry Downlink Control Information (DCI) such as scheduling decisions for uplink (UL; from device to network) and downlink (DL; from network to device) and power control commands. Both PDCCH and ePDCCH are according to present communications networks transmitted once per ims subframe.

3 GPP TS 36.212 lists examples of different (DCI) formats for UL and DL resource assignments. UL scheduling grants use either DCI format 0 or DCI format 4. The latter was added in the 3rd Generation Partnership Project (3 GPP) Release 10 (Rel-10) for supporting uplink spatial multiplexing The existing way of operation, e.g. frame structure and control signalling, are designed for data allocations in subframes of a fixed length of 1 ms, which may vary only in allocated bandwidth. Specifically, the current DCIs define resource allocations within the entire subframe, and are only transmitted once per subframe. The existing way of operation does not indicate how scheduling of UL and DL data can be performed in short subframes, i.e., subframes shorter than 1 ms.

Hence, there is a need for efficient communications using short subframes.

SUMMARY

An object of embodiments herein is to provide mechanisms for communications using short subframe.

According to a first aspect there is presented a method for granting resources to a wireless device. The method is performed by a network node. The method comprises obtaining an indication for granting the resources to the wireless device. The method comprises transmitting, to the wireless device, a grant for the resources in a transmission time interval (sTTI) frequency band. The grant comprises an index, and the index identifies a position of the resources within the sTTI frequency band.

According to a second aspect there is presented a network node for granting resources to a wireless device. The network node comprises processing circuitry. The processing circuitry is configured to cause the network node to obtain an indication for granting the resources to the wireless device. The processing circuitry is configured to cause the network node to transmit, to the wireless device, a grant for the resources in a sTTI frequency band. The grant comprises an index, and the index identifies a position of the resources within the sTTI frequency band.

According to a third aspect there is presented a network node for granting resources to a wireless device. The network node comprises processing circuitry and a computer program product. The computer program product stores instructions that, when executed by the processing circuitry, causes the network node to perform steps, or operations. The steps, or operations, cause the network node to obtain an indication for granting the resources to the wireless device. The steps, or operations, cause the network node to transmit, to the wireless device, a grant for the resources in a sTTI frequency band. The grant comprises an index, and the index identifies a position of the resources within the sTTI frequency band.

According to a fourth aspect there is presented a network node for granting resources to a wireless device. The network node comprises an obtain module configured to obtain an indication for granting the resources to the wireless device. The network node comprises a transmit module configured to transmit, to the wireless device, a grant for the resources in a sTTI frequency band. The grant comprises an index, and the index identifies a position of the resources within the sTTI frequency band.

According to a fifth aspect there is presented a computer program for granting resources to a wireless device, the computer program comprising computer program code which, when run on processing circuitry of a network node, causes the network node to perform a method according to the first aspect.

According to a sixth aspect there is presented a method for receiving granting of resources from a network node. The method is performed by a wireless device. The method comprises obtaining an indication for receiving a grant of the resources from the network node. The method comprises receiving, in a sTTI frequency band and from the network node, the grant for the resources for the wireless device. The grant comprises an index, and the index identifies a position of the resources within the sTTI frequency band.

According to a seventh aspect there is presented a wireless device for receiving granting of resources from a network node. The wireless device comprises processing circuitry. The processing circuitry is configured to cause the wireless device to obtain an indication for receiving a grant of the resources from the network node. The processing circuitry is configured to cause the wireless device to receive, in a sTTI frequency band and from the network node, the grant for the resources for the wireless device. The grant comprises an index, and the index identifies a position of the resources within the sTTI frequency band.

According to an eighth aspect there is presented a wireless device for receiving granting of resources from a network node. The wireless device comprises processing circuitry and a computer program product. The computer program product stores instructions that, when executed by the processing circuitry, causes the wireless device to perform steps, or operations. The steps, or operations, cause the wireless device to obtain an indication for receiving a grant of the resources from the network node. The steps, or operations, cause the wireless device to receive, in a sTTI frequency band and from the network node, the grant for the resources for the wireless device. The grant comprises an index, and the index identifies a position of the resources within the sTTI frequency band.

According to a ninth aspect there is presented a wireless device for receiving granting of resources from a network node. The wireless device comprises an obtain module configured to obtain an indication for receiving a grant of the resources from the network node. The wireless device comprises a receive module configured to receive, in a sTTI frequency band and from the network node, the grant for the resources for the wireless device. The grant comprises an index, and the index identifies a position of the resources within the sTTI frequency band.

According to a tenth aspect there is presented a computer program for receiving granting of resources from a network node, the computer program comprising computer program code which, when run on processing circuitry of a wireless device, causes the wireless device to perform a method according to the sixth aspect.

According to an eleventh aspect there is presented a computer program product comprising a computer program according to at least one of the fifth aspect and the tenth aspect and a computer readable storage medium on which the computer program is stored. The computer readable storage medium can be a non-transitory computer readable storage medium.

Advantageously these methods, these network nodes, these wireless devices, and these computer programs provides efficient communications using short subframe Advantageously this enables the sTTI frequency band to be split and to cater for several wireless devices, whilst specifying, and communicating, the split in the sTTI frequency band between wireless devices in an efficient way. The control information, comprising the index transmitted in the grant, share the same resources as data, thereby limiting the overhead. The size of the control information is allowed to be flexible (e.g. in number of control channel elements), whilst keeping the resources granted for the wireless devices to be clearly defined.

It is to be noted that any feature of the first, second, third, fourth, fifth, sixth seventh, eight, ninth, tenth and eleventh aspects may be applied to any other aspect, wherever appropriate. Likewise, any advantage of the first aspect may equally apply to the second, third, fourth, fifth, sixth, seventh, eight, ninth, tenth, and/or eleventh aspect, respectively, and vice versa. Other objectives, features and advantages of the enclosed embodiments will be apparent from the following detailed disclosure, from the attached dependent enumerated embodiments as well as from the drawings.

Generally, all terms used in the enumerated embodiments are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The inventive concept is now described, by way of example, with reference to the accompanying drawings, in which:

FIG. 1 is a schematic diagram illustrating a communication network according to embodiments;

FIGS. 2, 3, 4, and 5 are flowcharts of methods according to embodiments.

DETAILED DESCRIPTION

Figure 4:
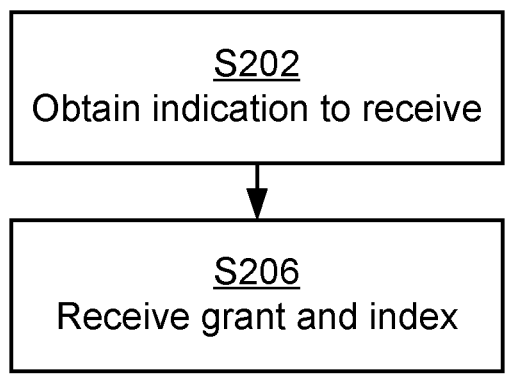

The inventive concept will now be described more fully hereinafter with reference to the accompanying drawings, in which certain embodiments of the inventive concept are shown. This inventive concept may, however, be embodied in many different forms and should not be construed as limited to the embodiments set forth herein; rather, these embodiments are provided by way of example so that this disclosure will be thorough and complete, and will fully convey the scope of the inventive concept to those skilled in the art. Like numbers refer to like elements throughout the description. Any step or feature illustrated by dashed lines should be regarded as optional.

FIG. 1 is a schematic diagram illustrating a communications network 100 where embodiments presented herein can be applied. The communications network 100 comprises at least one network node 200. The functionality of the network node 200 and how it interacts with other entities, nodes, and devices in the communications network 100 will be further disclosed below.

The communications network 100 further comprises at least one radio access network node 140. The at least one radio access network node 140 is part of a radio access network 110 and operatively connected to a core network 120 which in turn is operatively connected to a service network 130. The at least one radio access network node 140 provides network access in the radio access network 110. A wireless device 300a, 300b served by the at least one radio access network node 140 is thereby enabled to access services and exchange data with the core network 120 and the service network 130.

Examples of wireless devices 300a, 300b include, but are not limited to, mobile stations, mobile phones, handsets, wireless local loop phones, user equipment (UE), smartphones, laptop computers, tablet computers, network equipped sensors, wireless modems, and Internet of Things devices. Examples of radio access network nodes 120 include, but are not limited to, radio base stations, base transceiver stations, NodeBs, evolved NodeBs, access points, and access nodes. As the skilled person understands, the communications network 100 may comprise a plurality of radio access network nodes 120, each providing network access to a plurality of wireless devices 300a, 300b. The herein disclosed embodiments are no limited to any particular number of network nodes 200, radio access network nodes 120 or wireless devices 300a, 300b.

The wireless device 300a, 300b accesses services and exchanges data with the core network 120 and the service network 130 by transmitting data in packets to the core network 120 and the service network 130 and by receiving data in packets from the core network 120 and the service network 130 via the radio access network node 140.

Packet latency has above been identified as degrading network performance. One area to address when it comes to packet latency reductions is the reduction of transport time of data and control signalling, by addressing the length of a transmission time interval (TTI). In LTE release 8, a TTI corresponds to one subframe (SF) of length 1 millisecond. One such 1 ms TTI is constructed by using 14 OFDM or SC-FDMA symbols in the case of normal cyclic prefix and 12 OFDM or SC-FDMA symbols in the case of extended cyclic prefix.

According to embodiment disclosed herein the TTIs are shortened by introducing shortened subframes (below denoted short subframes). With a short TTI (below denoted sTTI), the subframes can be decided to have any duration in time and comprise resources on a number of OFDM or SC-FDMA symbols within a 1 ms subframe. As one example, the duration of a short subframe may be 0.5 ms, i.e., seven OFDM symbols or SC-FDMA symbols for the case with normal cyclic prefix.

As mentioned, one way to reduce latency is to reduce the transmission time interval (TTI), and instead of assigning resources with a time duration of 1 ms, there is then a need to assign resources with shorter duration such as a number of OFDM symbols or SC-FDMA symbols. This implies a need for device specific control signalling that enables indication of such short scheduling assignments.

Using scheduling with 1 ms TTIs, the wireless devices 300a, 300b are allocated frequency resources based on, e.g., bitmaps in DCI fields identifying used resource blocks. As the TTI length is shortened, this may lead to an increased signaling overhead if the allocation is specified several times per subframe. Having a grant only to a single wireless device 300a, 300b per such short TTI will limit the overhead. It might be further beneficial to share the frequency resources within a short TTI between several wireless device 300a, 300b, while limiting the amount of control overhead.

The herein disclosed embodiments propose different ways of sharing the DL and UL sTTI bands, by including a frequency split allocation while still limiting the amount of control information. In addition, a limitation of UL frequency allocation is proposed to provide efficient coverage in power-limited scenarios.

The embodiments disclosed herein thus relate to mechanisms for granting resources to a wireless device 300a. In order to obtain such mechanisms there is provided a network node 200, a method performed by the network node 200, a computer program product comprising code, for example in the form of a computer program, that when run on processing circuitry of the network node 200, causes the network node 200 to perform the method.

The embodiments disclosed herein further relate to mechanisms for receiving granting of resources from a network node 200. In order to obtain such mechanisms there is further provided a wireless device 300a, 300b, a method performed by the wireless device 300a, 300b, and a computer program product comprising code, for example in the form of a computer program, that when run on processing circuitry of the wireless device 300a, 300b, causes the wireless device 300a, 300b to perform the method.

Figure 5:
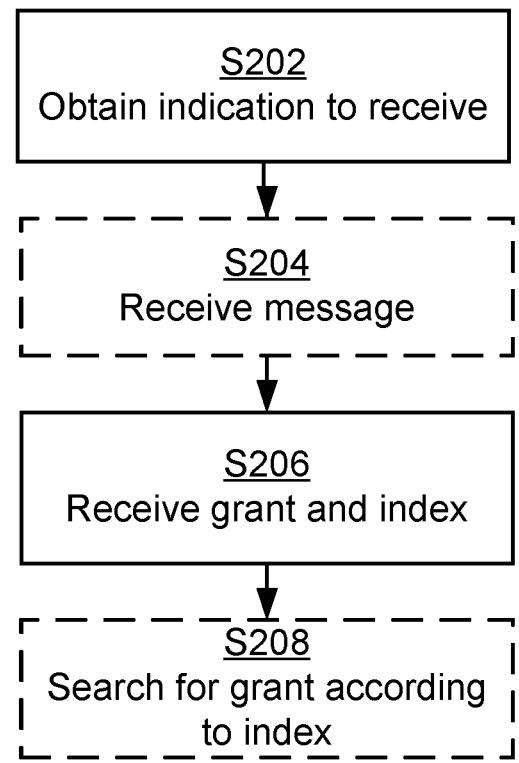

FIGS. 2 and 3 are flow charts illustrating embodiments of methods for granting resources to a wireless device 300a as performed by the network node 200. FIGS. 4 and 5 are flow charts illustrating embodiments of methods for receiving granting of resources from a network node 200 as performed by the wireless device 300a, 300b. The methods are advantageously provided as computer programs 1620a, 1620b (see below).

Reference is now made to FIG. 2 illustrating a method for granting resources to a wireless device 300a as performed by the network node 200 according to an embodiment.

S102: The network node 200 obtains an indication for granting the resources to the wireless device 300a.

S106: The network node 200 transmits, to the wireless device 300a, a grant for the resources in an sTTI frequency band. The grant comprises an index, and the index identifies a position of the resources within the sTTI frequency band.

The grant transmitted in step S106 can be regarded as a fast grant.

At least two such grants can be provided in one (single) Orthogonal Frequency Division Multiplexing (OFDM) symbol in the sTTI frequency band and hence be transmitted to at least two wireless devices 300a, 300b.

The term sTTI is above used to denote a short TTI, i.e., a TTI of a short subframe. The short subframe can have a shorter duration in time than 1 ms Hence, the TTI frequency band in which the grant for the wireless device 300a is transmitted in step S106 can be a short TTI frequency band. The sTTI can be defined as being shorter than the interval between two consecutive PDCCH transmissions (as being transmitted once every 1 ms). To achieve latency reduction the networks node 200 can thus be configured to schedule data on short timeframes, such as at sTTI level.

Embodiments relating to further details of granting resources to a wireless device 300a will now be disclosed.

Reference is now made to FIG. 3 illustrating methods for granting resources to a wireless device 300a as performed by the network node 200 according to further embodiments. It is assumed that steps S102, S106 are performed as disclosed with reference to FIG. 2 and a repeated description of these steps is therefore omitted.

According to an embodiment the network node 200 is configured to provide the wireless device 300a with a definition of the sTTI frequency band and hence be configured to perform step S104:

S104: The network node 200 transmits a message to the wireless device 300a, where the message defines the sTTI frequency band.

The message transmitted in step S104 can be regarded as a slow grant.

Step S104 can be performed after step S102 but before step S106.

The message in step S104 can be transmitted as a grant on a Physical Downlink Control Channel (PDCCH) and provide an identification of the sTTI frequency band. Alternatively, the message is transmitted using radio resource control (RRC) signalling. That is, the sTTI frequency band may be configured over RRC or with a PDCCH grant, where the former constitutes a semi-static allocation and the latter can be either a dynamic allocation valid for one subframe or a semi-persistent allocation valid for multiple subframes.

For example, one or more sPDSCH regions can be defined in the sTTI frequency bands. One or more sTTI frequency bands can be common for some or all wireless devices 300a, 300b using short TTIs. Multiple more sPDSCH regions can be used to cater for different subgroups wireless devices 300a, 300b using the sTTI. Each sTTI frequency band can occupy a number of resource blocks for the entire subframe, with the exception of the allocated PDCCH region. The sTTI frequency band can be defined by the PDCCH once per 1 ms, such as in the slow grant. The placement of the one or more sPDSCH regions in the sTTI frequency band can be done for each sTTI, thus more often than once per 1 ms. The grant transmitted in step S106 can therefore be transmitted as a fast grant on a PDCCH and provide an identification of the sTTI frequency band. Further, the grant transmitted in step S106 can be provided in a sPDSCH region of the sTTI frequency band. Thus, the PDCCH can define the sTTI frequency band once per 1 ms; and the sPDCCH can define the sPDSCH (which is a subset of the sTTI frequency band) more often than once per 1 ms. A symbol length search space for the grant can thereby be defined for sTTI scheduling of data by mapping the sPDSCH region to the location of the grant.

The term short PDSCH (sPDSCH) denotes the short physical downlink shared channel when using a short subframe and the term short PUSCH (sPUSCH) denote short physical uplink shared channel when using a short subframe. Similarly, short PDCCH (sPDCCH) is used to denote the short physical downlink control channel when using a short subframe, sDCI is used to denote short DCI (Downlink Control Information) when using a short subframe, and sCCE is used to denote a short CCE (Control Channel Element) when using a short subframe.

The grant can be provided in a short DCI (sDCI) message. In this respect, since the sTTI UL and DL scheduling can be transmitted many times per subframe to a wireless device 300a, it can be necessary to limit the amount of information contained in the sDCI messages. The index as transmitted in step S106 can by the wireless device 300a be used to identify one of a predefined set of configurations. The sDCI information could thus be positioned in a predefined sCCE pattern within the first OFDM symbol of the downlink sTTI. The rest of the downlink sTTI OFDM symbols (excluding PDSCH reference symbols) within the sTTI can then be used for sPDSCH.

Further, an indication of the length of the sTTI (in number of OFDM symbols) can be signaled in the grant. Further, the length of the sTTI can be given as DCI once per subframe, be configured using RRC signalling, or be pre-defined. For example, as disclosed above, a message defining the sTTI frequency band could be transmitted using RRC signalling. In other words, the sTTI frequency band could be configured using RRC signalling.

In order for multiple wireless devices 300a, 300b to share the available frequency resources, a split in frequency is defined. The split can be defined in the slow grant (as transmitted in step S104). Hence, according to an embodiment the identified position is a starting position of a region for the resources within the sTTI frequency band. The index can further identify placement of the region within the sTTI frequency band. According to aspects each fast grant (as transmitted in step S106) to a wireless device 300a, 300 comprises an indication as given in Table 1.

TABLE 1

Possible allocations in a DL sTTI.

| Notation | Used region |
|---|---|
| 1/1 | Whole sTTI frequency band |
| 1/2 | First half of sTTI frequency band |
| 2/2 | Second half of sTTI frequency band |
| 1/4 | First quarter of sTTI frequency band |
| 2/4 | Second quarter of sTTI frequency band |
| 3/4 | Third quarter of sTTI frequency band |
| 4/4 | Fourth quarter of sTTI frequency band |

The sTTI frequency band is according to this non-limiting illustrative example divided into quarters, allowing for four different wireless devices 300a, 300b to access the sTTI frequency band. However, according to some aspects the frequency split is not evenly distributed. For example, the first occurring parts of the split may be made relatively wider than the later occurring parts since the first occurring parts are more likely to be covered by DCIs.

Figure 6:
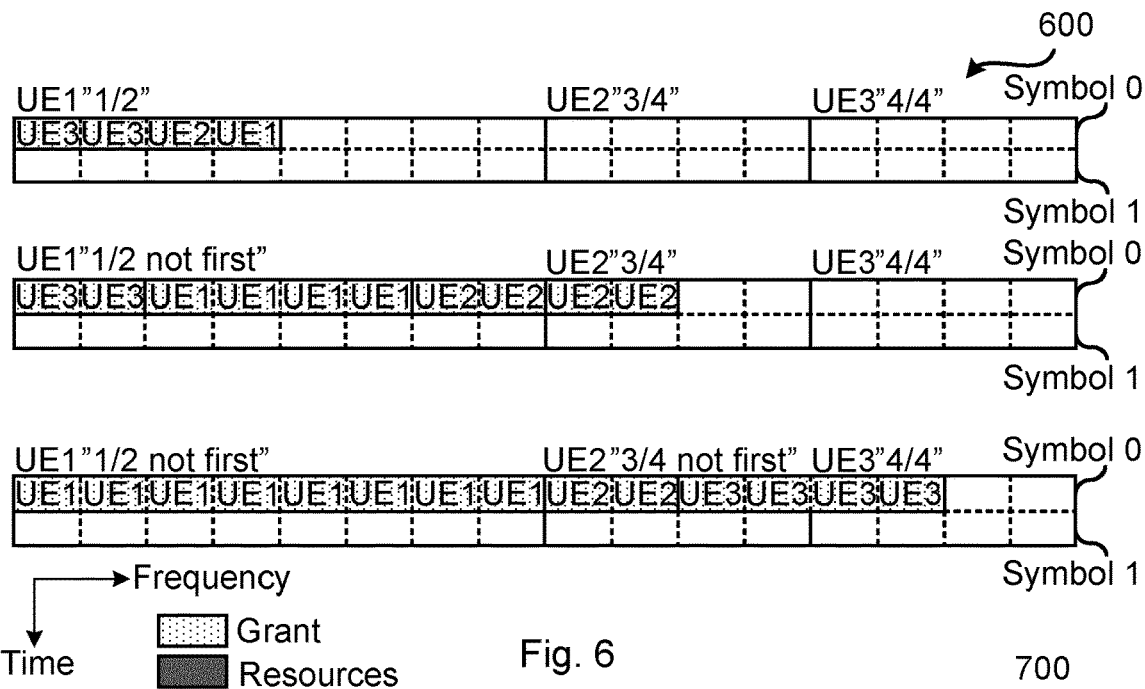
FIGS. 6, 7, 8, 9, 10, and 11 are schematic illustrations of sTTIs with allocations of grants according to embodiments.

FIG. 6 at 600 illustrates sTTIs with allocations of grants according to an embodiment. In the example in FIG. 6 an sTTI frequency band of 16 resource blocks (RBs) is used. FIG. 6 shows three examples of allocating resources to three wireless devices 300a, 300b. In the upper part, using the notation from Table 1, the wireless devices denoted UE2 and UE3 are scheduled in the "3/4" part and the "4/4" part, respectively, and wireless device denoted UE1 is scheduled in the "1/2" part. Hence, according to an embodiment the sTTI frequency band comprises at least two grants for resources to respective wireless devices 300a, 300b, and the sTTI frequency band is divided in sections. The sTTI frequency band can be divided in as many sections as there are wireless devices 300a, 300b. Alternatively, the sTTI frequency band is divided in fewer sections or more sections. As an example, some of the grants could refer to UL resources (where some wireless devices 300a, 300b may receive only UL grant), and then the sTTI frequency band can be divided into less sections than there are wireless devices 300a, 300b.

When a wireless device 300a, 300b has found its DCI with a DL grant at a certain location, it can determine PDSCH resources based on the following cases: Firstly, if the DCI is not placed in the assigned split, then all of the resources in the split belong to that wireless device 300a, 300b (as for UE2 and UE3 in the upper part of FIG. 6). Hence, according to an embodiment, if the grant for a given wireless device 300a of the wireless devices 300a, 300b is not placed in the section identified by the index to that given wireless device 300a, then all resources in the section identified by the index belong to that given wireless device 300a. Secondly, if the DCI is placed within the split assigned to that wireless device 300a, 300b, then for the first symbol, the resources to the right of the DCI in that split belong to the wireless device 300a, 300b (as for UE1 in upper part of FIG. 6). Hence, according to an embodiment the sTTI frequency band comprises at least two grants for resources to respective wireless devices 300a, 300b, and the resources of the grant that appears last of the at least two grants appear first of the resources to the wireless devices 300a, 300b in the sTTI frequency band.

The middle part of FIG. 6 illustrates a scenario where more resources are used for control. Particularly, according to an embodiment there are two orthogonal frequency-division multiplexing (OFDM) symbols in which the resources are allocated, and the grant comprises a flag, and the flag indicates in which of the two symbols the position of the resources within the sTTI frequency band is placed. A flag as defined in Table 2 can be introduced to indicate the symbol in which the resource for the wireless device 300a, 300b are placed.

TABLE 2

Indicator of using first symbol for data.

| Value | Meaning |
| --- | --- |
| skip_first_symbol = 0 | Wireless device has data in first symbol |
| skip_first_symbol = 1 | Wireless device has no data in first symbol |

In the middle part of FIG. 6, using the notation from Table 1, the wireless device denoted UE3 is given the "4/4" part, and the wireless device denoted UE2 is given the "3/4" part, and the above rules define which resources to use with the skip_first_symbol flag not set (i.e., skip_first_symbol=0). For the wireless device denoted UE1, the skip_first_symbol flag is set (i.e., skip_first_symbol=1) since it is not possible to schedule any data in the first symbol to UE1.

In the bottom part of FIG. 6, the DCI messages cover a relatively large portion of the resources and the grants for both UE1 and UE2 have the skip_first_symbol flag set.

In FIG. 6, no distinction is made between DL and UL grants. For the determination of used PDSCH resources, only the placement of the last DL grant is of importance, as the UL grant does not specify DL resources.

According to some aspects, the first symbol is assigned only to a single wireless device 300a, 300b and never shared between multiple wireless devices 300a, 300b. Hence, according to an embodiment there are at least two symbols in which the resources are allocated, and at least a first time-wise occurring symbol of the at least two symbols only comprises resources to a single wireless device 300a.

Figure 7:
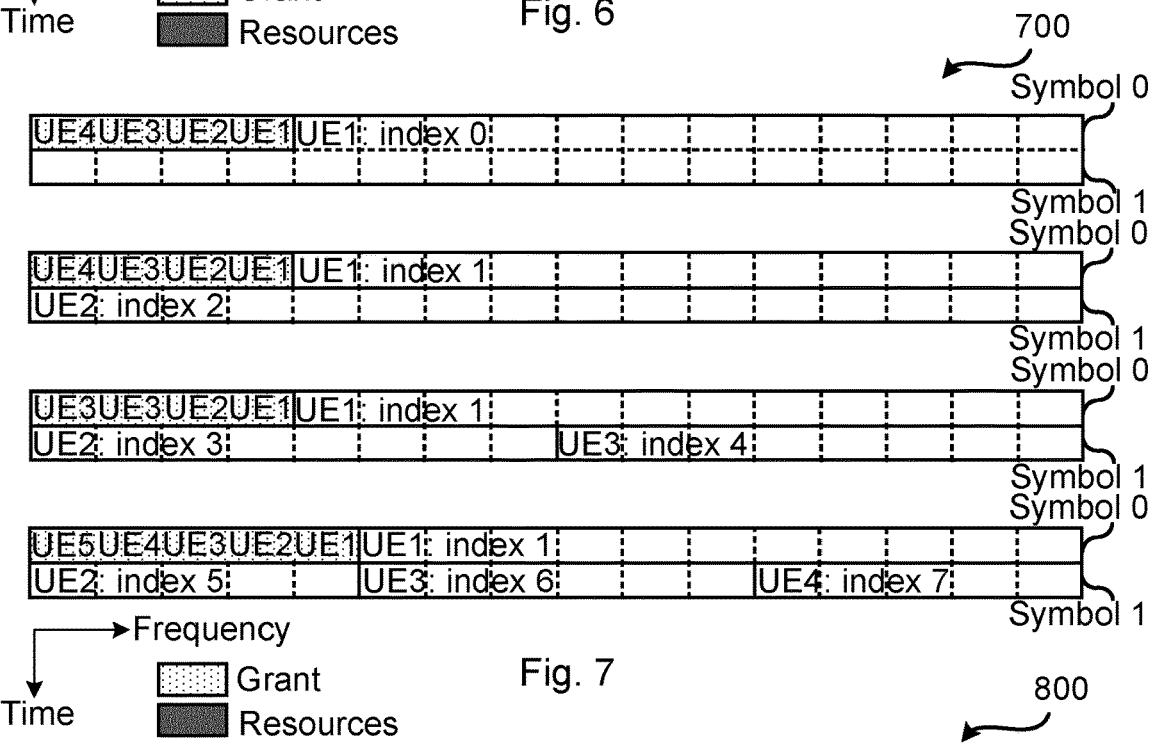

FIG. 7 at 700 illustrates sTTIs with allocations of grants according to an embodiment. FIG. 7 shows four examples for resources granted to one, two, three and four wireless devices denoted UE1, UE2, UE3, and UE4. In the upper-most part of FIG. 7 is shown an example for DL resources scheduled for a single wireless device UE1. In the first symbol, the wireless devices UE2, UE3 and UE4 are thus not allocated DL resources, and UE1 knows that its data part starts after the DCI that UE1 decoded. In the second to upper-most part of FIG. 7 is shown an example for DL resources scheduled for wireless devices UE1 and UE2. In the second to lower-most part of FIG. 7 is shown an example for DL resources scheduled for wireless devices UE1, UE2, and UE3.

In the lower-most part of FIG. 7 is shown an example for DL resources scheduled for wireless devices UE1, UE2, UE3, and UE4. The indices used in the example of FIG. 7 are listed in Table 3. Using such indices, multiple wireless device 300a, 300b can be allocated resources, as exemplified in FIG. 7, with the data resources for each respective wireless device 300a, 300b clearly defined.

TABLE 3

Possible allocations in DL sTTI.

| Value | Used region |
| --- | --- |
| 0 | Whole sTTI frequency band, all symbols |
| 1 | Only first symbol in sTTI frequency band |
| 2 | Only second symbol in sTTI frequency band |
| 3 | First half of second symbol in sTTI frequency band |
| 4 | Second half of second symbol in sTTI frequency band |
| 5 | First third of second symbol in sTTI frequency band |
| 6 | Middle third of second symbol in sTTI frequency band |
| 7 | Last third of second symbol in sTTI frequency band |

Figure 8:
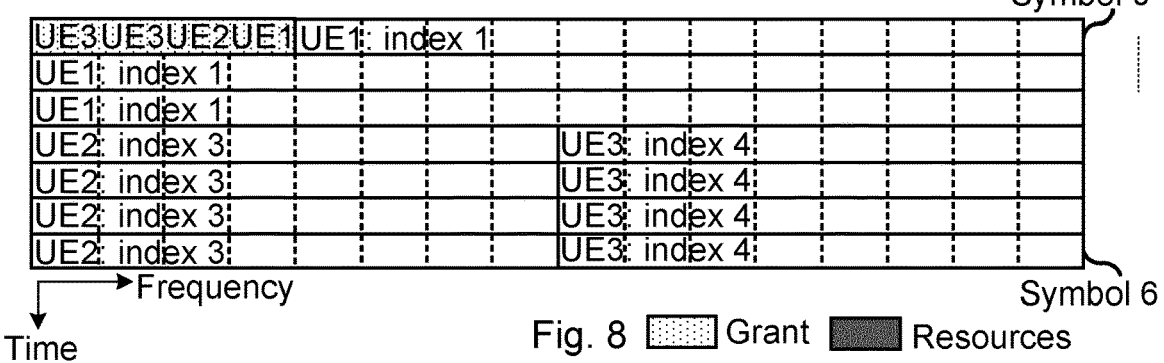

The approach of using indices as listed in Table 3 is applicable also to scenarios where more than two symbols are used. Hence, according to an embodiment there are at least two symbols in which the resources are allocated, and the index indicates in which of the at least two symbols the position of the resources within the sTTI frequency band is placed. FIG. 8 shows an example of this. FIG. 8 at 800 illustrates sTTIs with allocations of grants according to an embodiment. In an embodiment, the wireless device 300a, 300b allocated to the first symbol also exclusively uses one or more following symbols (first three symbols in total according to the illustrative example of FIG. 8), and this number may be signaled or tabulated as a function of TTI length. That is, according to an embodiment the index further identifies how many of the at least two symbols only comprise resources to said single wireless device 300a.

In yet another embodiment, there is no split in frequency, and the wireless devices 300a, 300b share the sTTI frequency band according to pure time division multiplexing. That is, according to an embodiment there are at least two symbols in which the resources are allocated, and each of the at least two symbols only comprises resources to a single wireless device 300a.

Figure 9:
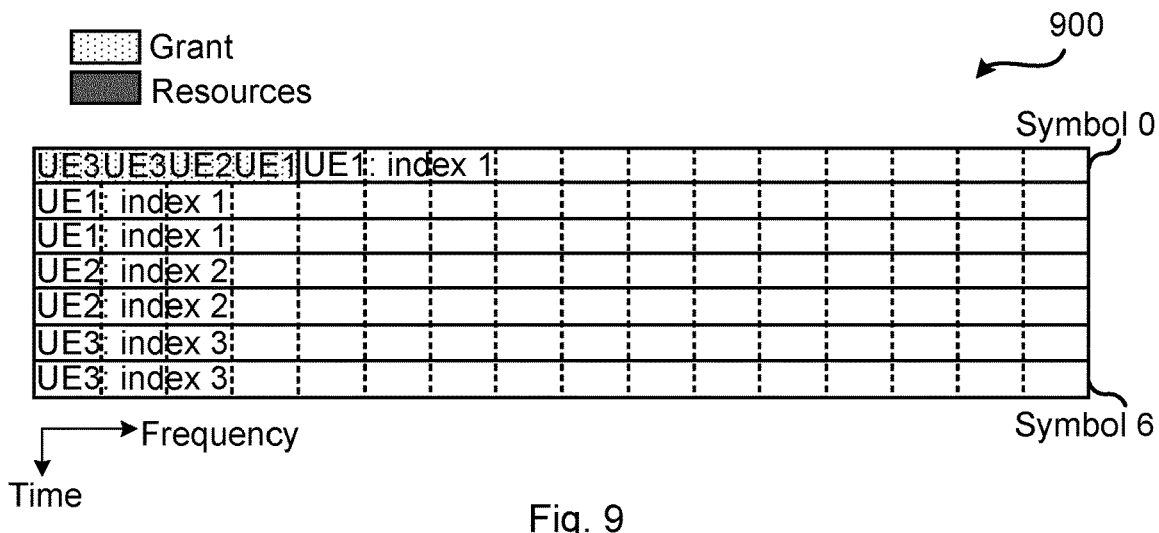

This is exemplified in FIG. 9. FIG. 9 at 900 illustrates sTTIs with allocations of grants according to an embodiment.

In addition to splitting the DL sTTI frequency band as described above, it is possible to assign split allocations also in the UL sTTI frequency band. Since no DCI messages need to be sent in the UL the split can be indicated with just an index. Hence, according to an embodiment at least two of the sections have mutually different lengths.

As an example, a 3-bit index sent in the DCI messages for UL sTTI transmissions may encode different parts of the spectrum just as is shown for DL in Table 1. This split of the UL sTTI frequency band thereby allows for up to four wireless devices 300a, 300b to transmit in the same UL sTTI. In another example shown in Table 4, also up to four wireless devices 300a, 300b can be granted resources in the same sTTI frequency band. As an example, using the allocation specified in Table 4, the possibility is given for coverage limited wireless devices 300a, 300b to focus their power by using fewer RBs.

TABLE 4

Indices for UL allocation split.

| Index | Allocation |
|---|---|
| 0 | Full sTTI frequency band |
| 1 | Lowest RB in sTTI frequency band |
| 2 | Second and third lowest RB in sTTI frequency band |
| 3 | Three lowest RB in sTTI frequency band |
| 4 | Fourth to eight lowest RB in sTTI frequency band |
| 5 | Lowest eight RB in sTTI frequency band |
| 6 | All but three lowest RB in sTTI frequency band |
| 7 | All but eight lowest RB in sTTI frequency band |

In order to increase coverage in UL, the used UL frequency range in the sTTI frequency band can be limited without supporting grants for resources to multiple wireless devices 300a, 300b in one UL sTTI. Hence, according to an embodiment there is only one single region within the sTTI frequency band, regardless of amount of resources allocated to this single region.

Figure 10:
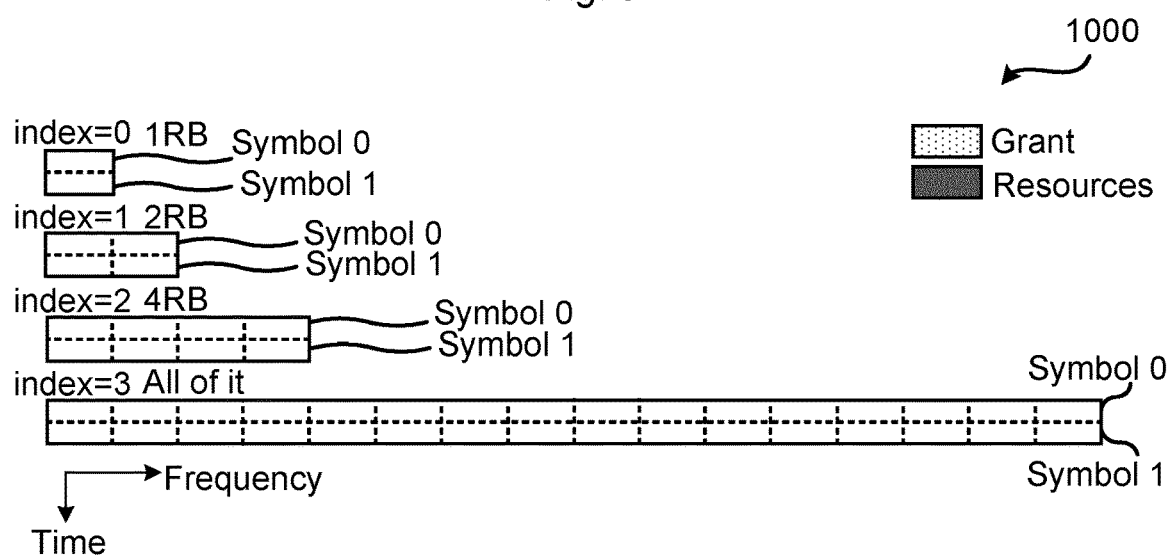

If only a limited amount of data needs to be transmitted in UL, and there is a total power limitation on the UL transmission, decreasing the UL frequency allocation may be desired. Table 5 and FIG. 10 show limitations in number of RBs, signaled in the UL grant; FIG. 10 at 1000 illustrates sTTIs with allocations of grants according to an embodiment. The rest of the UL sTTI frequency band may in this scenario be unutilized, but the coverage for this wireless device could be improved.

TABLE 5

Limitation or UL frequency range.

| Index | Frequency range |
|---|---|
| 0 | 1 RB in sTTI frequency band |
| 1 | 2 RB in sTTI frequency band |
| 2 | 4 RB in sTTI frequency band |
| 3 | Full bandwidth of sTTI frequency band |

Figure 11:
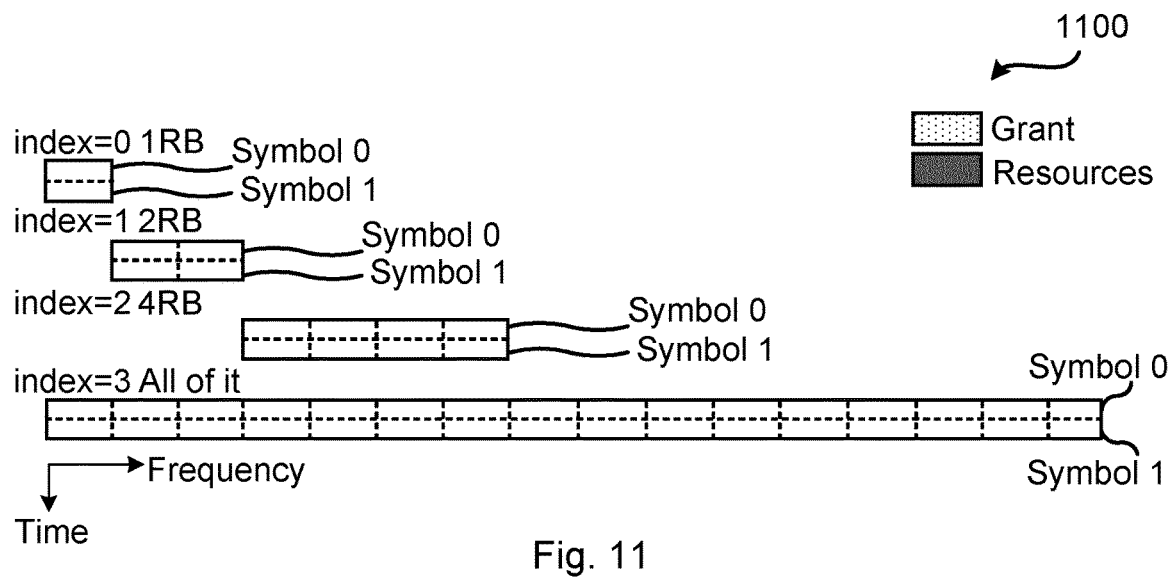

An alternative placement of the UL resources is illustrated in FIG. 11; FIG. 11 at 1100 illustrates sTTIs with allocations of grants according to an embodiment.

According to FIG. 11, the UL resources are placed in the sTTI frequency band such that the different frequency intervals of the UL resources for different wireless devices do not overlap and can be used simultaneously by different wireless devices.

In the examples of FIGS. 6 to 11, sTTI frequency bands corresponding to 16 RBs are shown. The DCI are shown to be placed contiguously from the beginning (i.e., from low frequency values to high frequency values). This is only a matter of illustrative graphical representation. The mapping from the logical frequency range shown in the figures to physical resource elements can be performed in several ways, typically using a pre-defined sequence. Having a mapping from logical elements to physical resource elements will increase the frequency diversity robustness of sPDCCH reception. This mapping is applicable to all embodiments disclosed herein. Hence according to embodiments there are at least two grants, and the at least two grants are mapped in sequential order in the sTTI frequency band. The sTTI frequency band can then be associated with a set of sequential indices to sub-carriers, and the sequential order can be defined according to a pre-defined mapping from sequential index in the set of sequential indices to sub-carrier index in the sTTI frequency band.

Reference is now made to FIG. 4 illustrating a method for receiving granting of resources from a network node 200 as performed by the wireless device 300a, 300b according to an embodiment.

S202: The wireless device 300a, 300b obtains an indication for receiving a grant of the resources from the network node 200.

As disclosed above, the network node 200 in step S106 transmits a grant for the resources in an sTTI frequency band to the wireless device 300a. It is assumed that the wireless device 300a receives this grant. Hence, the wireless device 300a, 300b is configured to perform step S206:

S206: The wireless device 300a, 300b receives, in a sTTI frequency band and from the network node 200, the grant for the resources for the wireless device 300a, 300b. As disclosed above, the grant comprises an index, and the index identifies a position of the resources within the sTTI frequency band. Examples of such an index have been disclosed above with reference to the network node 200 and those embodiments are equally applicable for the wireless device 300a, 300b.

Since the message transmitted in step S106 can be regarded as a fast grant, the grant received in step S206 can be regarded as a fast grant.

Reference is now made to FIG. 5 illustrating methods for receiving granting of resources from a network node 200 as performed by the wireless device 300a, 300b according to further embodiments. It is assumed that steps S202, S206 are performed as disclosed with reference to FIG. 4 and a repeated description of these steps is therefore omitted.

As disclosed above, according to an embodiment the network node 200 in step S104 transmits a message to the wireless device 300a. Hence, according to an embodiment the wireless device 300a, 300b is configured to perform step S204:

S204: The wireless device 300a, 300b receives a message to from the network node 200, where the message defines the sTTI frequency band.

Since the message transmitted in step S104 can be regarded as a slow grant, the message received in step S204 can be regarded as a slow grant.

Upon having received the index in step S206 the wireless device 300a, 300b can be configured to search the sTTI frequency band for the grant, and hence be configured to perform step S208:

S208: The wireless device 300a, 300b searches for the grant in the sTTI frequency band according to the index. For example, the wireless device 300a, 300b could perform a mapping from the index to actual RBs according to some table (such as any of above Tables 1 to 5), whilst taking into account the allowed number of RBs. For example, according to some aspects, the only allowed numbers of RBs are multiples of 2, 3, and/or 5. This could imply that some of the indices in Tables 1 to 5 are not used at all, or are not used without modifications. For example, with reference to Table 4, depending on the number of total RBs in the sTTI frequency band, the allocation "All but eight lowest RB in sTTI frequency band" could imply a value of the number of RBs that is not a product of 2, 3 or 5 and thus be modified to "All but eight lowest RB in sTTI frequency band rounded downwards to the nearest multiple of 2, 3 and/or 5". For example, with again reference to Table 4, the allocation defined by index 6 (i.e., "All but three lowest RB in sTTI frequency band") could be modified to "All but three lowest RB in sTTI frequency band, rounded downwards to the nearest multiple of 2, 3 and/or 5", and so on. Using RBs as multiples of 2, 3, and/or 5 allows implementation of only radix-2, radix-3, and/or radix-5 fast Fourier Transforms (FFTs). According to other aspects there is no such restriction in terms of the allowed numbers of RBs.

Embodiments relating to further details of granting resources to a wireless device 300a as performed by the network node 200 and receiving granting of resources from a network node 200 as performed by the wireless device 300a, 300b will now be disclosed.

There may be different ways to transmit the grant in step S106 (and hence receive the grant in step S206). As noted above, the grant could be provided in an sDCI message. For example, the grant itself could be provided in the sTTI frequency band. Alternatively, the grant is provided on a Physical Downlink Control Channel (PDCCH). Further, the grant can be provided in a short Physical Downlink Control Channel (sPDCCH) region of the sTTI frequency band.

For illustrative purposes some embodiments have been disclosed in a DL context and other embodiments have been disclosed in a UL context. For embodiments relating to DL grants, the resources are DL data. The DL data could be provided in an sPDSCH region of the sTTI frequency band. For embodiments relating to UL grants, the resources are UL data. The UL data could be provided in an sPUSCH region of the sTTI frequency band.

Figure 12:
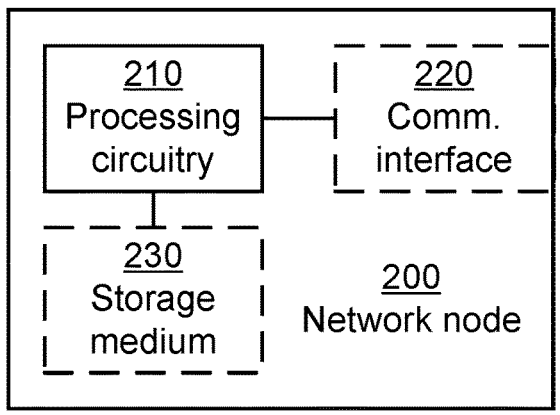
FIG. 12 is a schematic diagram showing functional units of a network node according to an embodiment.

FIG. 12 schematically illustrates, in terms of a number of functional units, the components of a network node 200 according to an embodiment. Processing circuitry 210 is provided using any combination of one or more of a suitable central processing unit (CPU), multiprocessor, microcontroller, digital signal processor (DSP), etc., capable of executing software instructions stored in a computer program product 1610a (as in FIG. 16), e.g. in the form of a storage medium 230. The processing circuitry 210 may further be provided as at least one application specific integrated circuit (ASIC), or field programmable gate array (FPGA).

Particularly, the processing circuitry 210 is configured to cause the network node 200 to perform a set of operations, or steps, S102-S106, as disclosed above. For example, the storage medium 230 may store the set of operations, and the processing circuitry 210 may be configured to retrieve the set of operations from the storage medium 230 to cause the network node 200 to perform the set of operations. The set of operations may be provided as a set of executable instructions. Thus the processing circuitry 210 is thereby arranged to execute methods as herein disclosed.

The storage medium 230 may also comprise persistent storage, which, for example, can be any single one or combination of magnetic memory, optical memory, solid state memory or even remotely mounted memory.

The network node 200 may further comprise a communications interface 220 for communications at least with a wireless device 300a, 300b. As such the communications interface 220 may comprise one or more transmitters and receivers, comprising analogue and digital components and a suitable number of antennas for wireless communications and ports for wireline communications.

The processing circuitry 210 controls the general operation of the network node 200 e.g. by sending data and control signals to the communications interface 220 and the storage medium 230, by receiving data and reports from the communications interface 220, and by retrieving data and instructions from the storage medium 230. Other components, as well as the related functionality, of the network node 200 are omitted in order not to obscure the concepts presented herein.

Figure 13:
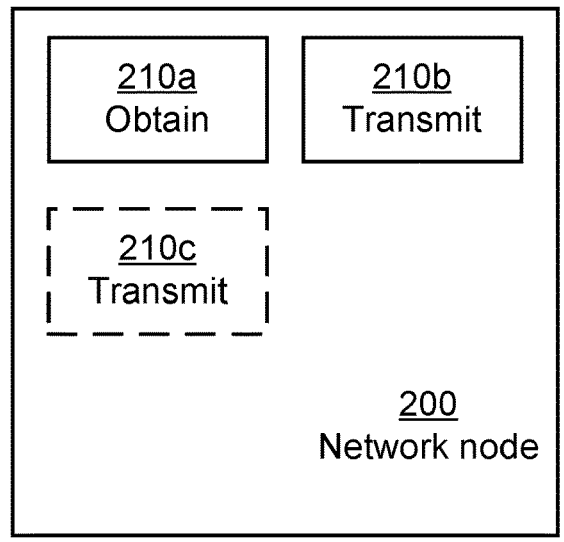
FIG. 13 is a schematic diagram showing functional modules of a network node according to an embodiment.

FIG. 13 schematically illustrates, in terms of a number of functional modules, the components of a network node 200 according to an embodiment. The network node 200 of FIG. 13 comprises a number of functional modules; an obtain module 210a configured to perform step S102, and a transmit module 210b configured to perform step S106. The network node 200 of FIG. 13 may further comprise a number of optional functional modules, such as a transmit module 210c configured to perform step S104. In general terms, each functional module 210a-210c may be implemented in hardware or in software. Preferably, one or more or all functional modules 210a-210c may be implemented by the processing circuitry 210, possibly in cooperation with functional units 220 and/or 230. The processing circuitry 210 may thus be arranged to from the storage medium 230 fetch instructions as provided by a functional module 210a-210c and to execute these instructions, thereby performing any steps of the network node 200 as disclosed herein.

The network node 200 may be provided as a standalone device or as a part of at least one further device. For example, the network node 200 may be provided in a node of the radio access network 110 or in a node of the core network 120. Alternatively, functionality of the network node 200 may be distributed between at least two devices, or nodes. These at least two nodes, or devices, may either be part of the same network part (such as the radio access network 110 or the core network 120) or may be spread between at least two such network parts. In general terms, instructions that are required to be performed in real time may be performed in a device, or node, in the radio access network 110.

Thus, a first portion of the instructions performed by the network node 200 may be executed in a first device, and a second portion of the of the instructions performed by the network node 200 may be executed in a second device; the herein disclosed embodiments are not limited to any particular number of devices on which the instructions performed by the network node 200 may be executed. Hence, the methods according to the herein disclosed embodiments are suitable to be performed by a network node 200 residing in a cloud computational environment. Therefore, although a single processing circuitry 210 is illustrated in FIG. 12 the processing circuitry 210 may be distributed among a plurality of devices, or nodes. The same applies to the functional modules 210a-210c of FIG. 13 and the computer program 1620a of FIG. 16 (see below).

Figure 14:
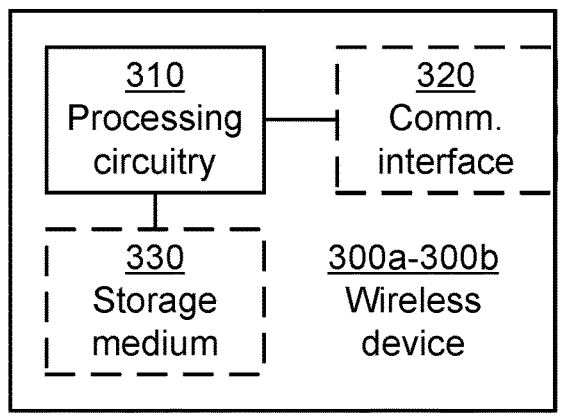
FIG. 14 is a schematic diagram showing functional units of a wireless device according to an embodiment.

FIG. 14 schematically illustrates, in terms of a number of functional units, the components of a wireless device 300a, 300b according to an embodiment. Processing circuitry 310 is provided using any combination of one or more of a suitable central processing unit (CPU), multiprocessor, microcontroller, digital signal processor (DSP), etc., capable of executing software instructions stored in a computer program product 1610b (as in FIG. 16), e.g. in the form of a storage medium 330. The processing circuitry 310 may further be provided as at least one application specific integrated circuit (ASIC), or field programmable gate array (FPGA).

Particularly, the processing circuitry 310 is configured to cause the wireless device 300a, 300b to perform a set of operations, or steps, S202-S208, as disclosed above. For example, the storage medium 330 may store the set of operations, and the processing circuitry 310 may be configured to retrieve the set of operations from the storage medium 330 to cause the wireless device 300a, 300b to perform the set of operations. The set of operations may be provided as a set of executable instructions. Thus the processing circuitry 310 is thereby arranged to execute methods as herein disclosed.

The storage medium 330 may also comprise persistent storage, which, for example, can be any single one or combination of magnetic memory, optical memory, solid state memory or even remotely mounted memory.

The wireless device 300a, 300b may further comprise a communications interface 320 for communications at least with a network node 200. As such the communications interface 320 may comprise one or more transmitters and receivers, comprising analogue and digital components and a suitable number of antennas for wireless communications and ports for wireline communications.

The processing circuitry 310 controls the general operation of the wireless device 300a, 300b e.g. by sending data and control signals to the communications interface 320 and the storage medium 330, by receiving data and reports from the communications interface 320, and by retrieving data and instructions from the storage medium 330. Other components, as well as the related functionality, of the wireless device 300a, 300b are omitted in order not to obscure the concepts presented herein.

Figure 15:
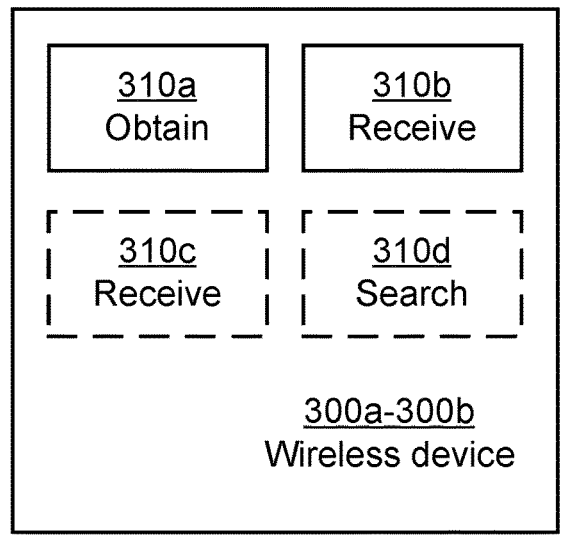
FIG. 15 is a schematic diagram showing functional modules of a wireless device according to an embodiment.

FIG. 15 schematically illustrates, in terms of a number of functional modules, the components of a wireless device 300a, 300b according to an embodiment. The wireless device 300a, 300b of FIG. 15 comprises a number of functional modules; an obtain module 310a configured to perform step S102, and a receive module 310b configured to perform step S206. The wireless device 300a, 300b of FIG. 15 may further comprises a number of optional functional modules, such as any of a receive module 310c configured to perform step S204, and a search module 310d configured to perform step S208. In general terms, each functional module 310a-310d may be implemented in hardware or in software. Preferably, one or more or all functional modules 310a-310d may be implemented by the processing circuitry 310, possibly in cooperation with functional units 320 and/or 330, The processing circuitry 310 may thus be arranged to from the storage medium 330 fetch instructions as provided by a functional module 310a-310d and to execute these instructions, thereby performing any steps of the wireless device 300a, 300b as disclosed herein.

Figure 16:
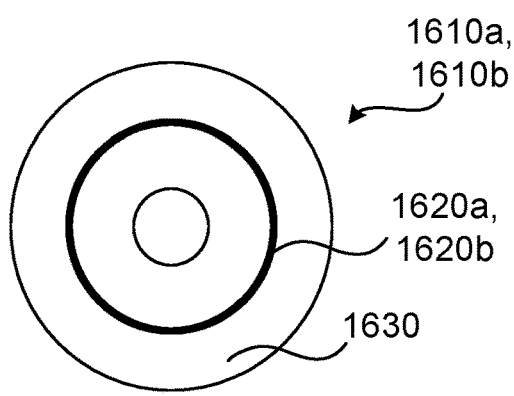
FIG. 16 shows one example of a computer program product comprising computer readable means according to an embodiment.

FIG. 16 shows one example of a computer program product 1610a, 1610b comprising computer readable means 1630. On this computer readable means 1630, a computer program 1620a can be stored, which computer program 1620a can cause the processing circuitry 210 and thereto operatively coupled entities and devices, such as the communications interface 220 and the storage medium 230, to execute methods according to embodiments described herein. The computer program 1620a and/or computer program product 1610a may thus provide means for performing any steps of the network node 200 as herein disclosed. On this computer readable means 1630, a computer program 1620b can be stored, which computer program 1620b can cause the processing circuitry 310 and thereto operatively coupled entities and devices, such as the communications interface 320 and the storage medium 330, to execute methods according to embodiments described herein. The computer program 1620b and/or computer program product 1610b may thus provide means for performing any steps of the wireless device 300a, 300b as herein disclosed.

In the example of FIG. 16, the computer program product 1610a, 1610b is illustrated as an optical disc, such as a CD (compact disc) or a DVD (digital versatile disc) or a Blu-Ray disc. The computer program product 1610a, 1610b could also be embodied as a memory, such as a random access memory (RAM), a read-only memory (ROM), an erasable programmable read-only memory (EPROM), or an electrically erasable programmable read-only memory (EEPROM) and more particularly as a non-volatile storage medium of a device in an external memory such as a USB (Universal Serial Bus) memory or a Flash memory, such as a compact Flash memory. Thus, while the computer program 1620a, 1620b is here schematically shown as a track on the depicted optical disk, the computer program 1620a, 1620b can be stored in any way which is suitable for the computer program product 1610a, 1610b.

The inventive concept has mainly been described above with reference to a few embodiments. However, as is readily appreciated by a person skilled in the art, other embodiments than the ones disclosed above are equally possible within the scope of the inventive concept, as defined by the appended claims.

The invention claimed is:

1. A method for granting resources to a wireless device, the method comprising a network node:
    obtaining an indication for granting the resources to the wireless device;
    transmitting, to the wireless device, a grant for the resources in a transmission time interval (sTTI) frequency band;
    wherein the grant comprises an index; and
    wherein the index identifies a position of the resources within the sTTI frequency band.

2. The method of claim 1, wherein the grant is provided in a Short Downlink Control Information (sDCI) message.

3. The method of claim 1, wherein the grant is provided in the sTTI frequency band.

4. The method of claim 1, wherein the grant is provided on a Physical Downlink Control Channel (PDCCH).

5. The method of claim 1, wherein the identified position is a starting position of a region for the resources within the sTTI frequency band.

6. The method of claim 5, wherein the index further identifies placement of the region within the sTTI frequency band.

7. The method of claim 5, wherein there is only one single region within the sTTI frequency band, regardless of amount of resources allocated to said single region.

8. The method of claim 1:
    wherein the sTTI frequency band comprises at least two grants for resources to respective wireless devices; and
    wherein the resources of the grant that appears last of the at least two grants appear first of the resources to the wireless devices in the sTTI frequency band.

9. The method of claim 1:
    wherein the sTTI frequency band comprises at least two grants for resources to respective wireless devices; and
    wherein the sTTI frequency band is divided in sections.

10. The method of claim 9, wherein, if the grant for a given wireless device of the wireless devices is not placed in the section identified by the index to that given wireless device, then all resources in the section identified by the index belong to that given wireless device.

11. The method of claim 9, wherein at least two of the sections have mutually different lengths.

12. The method of claim 1:
    wherein there are two orthogonal frequency-division multiplexing (OFDM) symbols in which the resources are allocated;
    wherein the grant comprises a flag; and wherein the flag indicates in which of the two symbols the position of the resources within the sTTI frequency band is placed.

13. The method of claim 1:
wherein there are at least two symbols in which the resources are allocated;
wherein the index indicates in which of the at least two symbols the position of the resources within the sTTI frequency band is placed.

14. The method of claim 1:
wherein there are at least two symbols in which the resources are allocated; and
wherein at least a first time-wise occurring symbol of the at least two symbols only comprises resources to a single wireless device.

15. The method of claim 14, wherein the index further identifies how many of the at least two symbols only comprise resources to said single wireless device.

16. The method of claim 1:
wherein there are at least two symbols in which the resources are allocated; and
wherein each of the at least two symbols only comprises resources to a single wireless device.

17. The method of claim 1, wherein the resources are Downlink (DL) data.

18. The method of claim 17, wherein the DL data is provided in a short Physical Downlink Shared Channel (sPDSCH) region of the sTTI frequency band.

19. The method of claim 1, wherein the resources are Uplink (UL) data.

20. The method of claim 19, wherein the UL data is provided in a short Physical Uplink Shared Channel (sPUSCH) region of the sTTI frequency band.

21. The method of claim 1, further comprising transmitting a message to the wireless device, the message defining the sTTI frequency band.

22. The method of claim 21, wherein the message is transmitted as a grant on a Physical Downlink Control Channel (PDCCH) and provides an identification of the sTTI frequency band.

23. The method of claim 21, wherein the message is transmitted using radio resource control (RRC) signalling.

24. The method of claim 1, wherein the grant is provided in a Physical Downlink Control Channel (PDCCH) region of the sTTI frequency band.

25. The method of claim 1, wherein there are at least two grants, and wherein the at least two grants are mapped in sequential order in the sTTI frequency band.

26. The method of claim 1:
wherein the sTTI frequency band is associated with a set of sequential indices to sub-carriers; and
wherein the sequential order is defined according to a pre-defined mapping from sequential index in the set of sequential indices to sub-carrier index in the sTTI frequency band.

27. The method of claim 26, wherein the at least two grants are provided in one Orthogonal Frequency Division Multiplexing (OFDM) symbol in the sTTI frequency band.

28. A method for receiving granting of resources from a network node, the method comprising a wireless device:
obtaining an indication for receiving a grant of the resources from the network node;
receiving, in a Transmission Time Interval (sTTI) frequency band and from the network node, the grant for the resources for the wireless device;
wherein the grant comprises an index; and
wherein the index identifies a position of the resources within the sTTI frequency band.

29. The method of claim 28, further comprising receiving a message from the network node, the message defining the sTTI frequency band.

30. The method of claim 28, further comprising searching for the grant in the sTTI frequency band according to the index.

31. A network node for granting resources to a wireless device, the network node comprising:
processing circuitry;
memory containing instructions executable by the processing circuitry whereby the network node is operative to:
obtain an indication for granting the resources to the wireless device;
transmit, to the wireless device, a grant for the resources in a transmission time interval (sTTI) frequency band;
wherein the grant comprises an index; and
wherein the index identifies a position of the resources within the sTTI frequency band.

32. A wireless device for receiving granting of resources from a network node, the wireless device comprising:
processing circuitry;
memory containing instructions executable by the processing circuitry whereby the wireless device is operative to:
obtain an indication for receiving a grant of the resources from the network node;
receive, in a Transmission Time Interval (sTTI) frequency band and from the network node, the grant for the resources for the wireless device;
wherein the grant comprises an index; and
wherein the index identifies a position of the resources within the sTTI frequency band.

* * * * *